June 28, 1960   W. E. ALTMANN   2,942,712
SELECTIVELY ENGAGEABLE CHANGE-SPEED TRANSMISSION
Filed Jan. 13, 1958
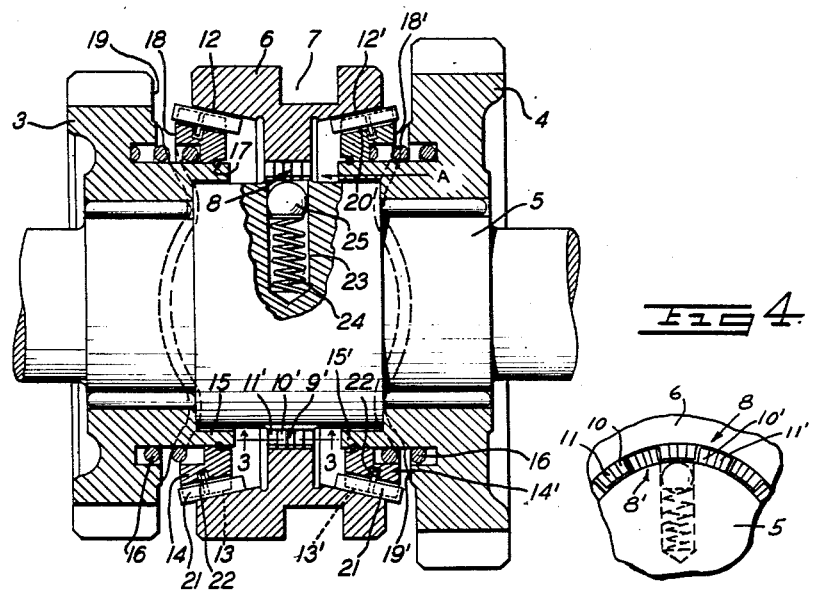
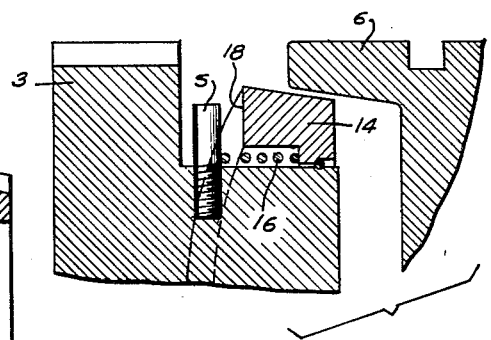
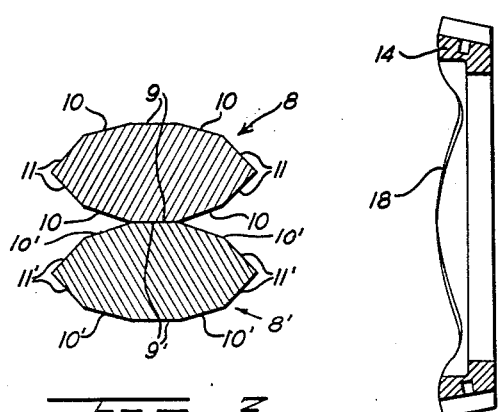
INVENTOR
WERNER E. ALTMANN
BY Dicke & Craig
ATTORNEYS

2,942,712
SELECTIVELY ENGAGEABLE CHANGE-SPEED TRANSMISSION

Werner E. Altmann, Stuttgart, Germany, assignor to Daimler-Benz Aktiengesellschaft, Stuttgart-Unterturkheim, Germany Filed Jan. 13, 1958, Ser. No. 708,412

Claims priority, application Germany Jan. 17, 1957

21 Claims. (Cl. 192—114)

The present invention relates to an arrangement for engaging and shifting selectively engageable change-speed transmissions which are shiftable in a step-like manner, especially motor vehicle transmissions provided with pairs of gears continuously in meshing engagement with each other, of which the loosely or freely rotatably supported gears are adapted to be selectively connected with the shaft thereof by an axially displaceable hub portion which serves for purposes of engagement with the loosely or freely rotatably supported gears.

It is known in the prior art to equip transmissions of the type mentioned hereinabove with means for obtaining synchronism between the two parts to be selectively engaged. The prior art devices ordinarily operate with slotted, springy or flexible synchronizing rings and subsequent form-locking engagement. However, the prior art devices are relatively expensive in the manufacture thereof, particularly by reason of the form-locking parts, and are subject to relatively high wear and tear. Furthermore, the forces to be applied at the shifting lever for purposes of shifting and for purposes of obtaining synchronism are oftentimes quite considerable and are, therefore, relatively annoying to the actuating person, for example, the driver of a motor vehicle.

The present invention seeks to achieve a change-speed transmission which is simple in construction, subject to relatively little wear, and which may be readily shifted by the provision of synchronizing means of appropriate construction. The problems encountered with the prior art devices are solved in accordance with the present invention in that with transmissions of the type mentioned hereinabove, a synchronizing ring closed upon itself is arranged axially springily at one of the two parts to be connected with each other, for example, at a freely rotatable gear, the synchronizing ring being adapted to enter into frictional engagement with the other part, for example, the hub part, and in that cooperating abutment surfaces are arranged at the carrier part carrying the synchronizing ring, for example, the gear wheel, in such a manner that upon relative movement of both parts with respect to each other, the ring is brought into the blocking position as a result of abutment of the abutment surfaces whereas only upon the attainment of synchronism of both parts the synchronizing ring may recede axially against the spring effect from the blocking position into the engaging position thereof.

The present invention is further based on the inventive concept of deriving the forces necessary for shifting and synchronization directly by the torque produced by the transmission and simultaneously to avoid the form-locking engagement altogether.

Accordingly, the present invention prefers an embodiment in which the axially displaceable hub portion is connected with the shaft part carrying the same by transmission surfaces which in the neutral position are arranged parallel to the shaft axis and which, for purposes of producing an axial force component from the torque in the blocking as well as in the engaging position are inclined with respect to the axis of the shaft. Friction surfaces of conically truncated shape are preferably arranged as engaging surfaces at the hub part and at the other part, preferably at the synchronizing ring.

The present invention further proposes, in accordance with another feature of the present invention, that the synchronizing ring is mounted on a cylindrical projection of the one part, for example, of the freely rotatable gear, and that a helical spring is arranged between the synchronizing ring and the part carrying the same, for example, the gear member, which helical spring constantly urges the synchronizing ring in the direction of the other part, for example, toward the hub portion. A spring or snap ring or any other suitable securing means thereby forms an abutment for the synchronizing ring so that it cannot be displaced or fall off from the extension of the gear member supporting the same. The abutment surfaces at the synchronizing ring and at the carrier part carrying or supporting the same, for example, at the gear member are constructed as complementary inclined surfaces, and the adjacent sides or faces of the synchronizing ring and of the carrier part, for example, of the gear member, are appropriately used therefor. The entrainment surfaces are constructed as curved tracks or cams upon themselves, for example, of sinusoidal shape. However, it is also understood that the countersurface for the abutment surface at the synchronizing ring or at the carrier part therefor may be formed by separate cams, pins or the like which may possibly be detachably secured thereto, a feature which may be advantageous under certain circumstances in the manufacture of the transmission and parts thereof.

The present invention offers the advantage that as a result of the inclined transmission surfaces, the axial force components produced from the torque provides the force for the abutment of the friction surfaces for purposes of synchronization of the rotational speed as well as for the subsequent force-locking engagement thereof. The synchronizing ring thereby serves simultaneously for purposes of the force-locking engagement so that expensive form-locking parts may be dispensed with and the engaging surfaces only require relatively little machining. The manufacture thereby becomes much more inexpensive.

The synchronizing ring is also relatively wear-resistant because, in contrast to springy, slotted rings, it is worn essentially evenly over the entire circumference thereof. The arrangement and installation according to the present invention thereby enables a very easy and quick shifting, especially also for the reason that in the embodiments, represented for purposes of illustration only, during the transition from the frictional engagement to the force-locking engagement thereof, no change in the engaging surfaces takes place. Consequently, the oil film needs to be effectively destroyed or removed only once at the engaging surfaces.

For purposes of a good and effective friction and force-locking engagement between the engaging surfaces, it is, as demonstrated by exhaustive experiments, of significant importance that the oil film between the two parts to be engaged is reliably removed. According to a further feature of the present invention which, however, is not limited to the illustrated embodiments, means cooperating with the friction surfaces are provided for the removal or reduction of the oil film. It is thereby appropriate if one or several wipe-off wedge members, having radial play are arranged essentially transversely to the friction surface within the friction surface of the synchronizing ring which are guided in an immovable manner. The wipe-off means may appropriately have an inclination to the outer surface of the friction surface and may possibly project beyond the edge thereof, particularly beyond the outer edge thereof.

The transmission surfaces serving for the transmission of torque between the hub portion and the shaft part are constructed as alternately interengaging radial pins arranged at both parts. These transmission surfaces of the pins which correspond to the blocking position thereof have a lesser inclination than the transmission surfaces corresponding to the engaging position. In order to enable shifting movement of the hub portion toward both sides, as, for example, it is desired with a motor vehicle transmission, the radial pins are advantageously symmetrically constructed with respect to the center plane extending parallel to the axis. One or several detent members, for example, ball members may be springily arranged within a shaft part, appropriately within the plane of the radial pins, which engage in detent recesses at the hub portion in the engaging positions thereof.

Accordingly, it is an object of the present invention to provide a selectively engageable change-speed transmission for motor vehicles which is simple in construction and inexpensive in manufacture.

It is another object of the present invention to provide a shifting arrangement for selectively engageable change-speed transmissions in which the various parts are subject to relatively little wear and tear.

Still another object of the present invention resides in the provision of a shifting arrangement for selectively engageable change-speed transmissions in which the engaging forces are relatively small.

Another object of the present invention is to provide a shifting arangement for change-speed transmissions in which expensive form- or force-locking parts are avoided.

A further object of the present invention is the provision of means which removes or at least considerably reduces any oil film which may exist between the friction surfaces to be engaged.

These and other objects, features and advantages of the present invention will become more obvious from the following description when taken in connection with the accompanying drawing which shows, for purposes of illustration only, several embodiments in accordance with the present invention, and wherein:

Figure 1 is an axial longitudinal cross-sectional view through a change-speed transmission in accordance with the present invention, Figure 2 is an axial cross-sectional view through a synchronizing ring by itself, Figure 3 is an enlarged partial cross-sectional view taken along line 3—3 of Figure 1 and showing the arrangement of the pins provided with transmission surfaces in accordance with the present invention, Figure 4 is a partial elevational view of the pin members 8 and 8' taken in the direction of arrow A of Figure 1, and Figure 5 is a partial axial longitudinal cross-sectional view through a modified embodiment of a change-speed transmission in accordance with the present invention.

While the embodiment illustrated in the present invention relates to a group-type motor vehicle transmission, it is understood that the same is not limited thereto but is applicable either partially or completely also to transmissions which may be shifted in a form-locking manner.

Referring now to the drawing, wherein like reference numerals are used throughout the various views to designate like parts, and more particularly to Figure 1, reference numerals 3 and 4 designate two gears which are rotatably mounted on the shaft 5, which may constitute, for example, the output shaft of the transmission. Each of the gears 3 and 4 is in continuous meshing engagement with another gear (not shown) which other gears are rigidly mounted on a countershaft (not shown). The two pairs of meshing gears may thereby form, for example, the first and second speed of a motor vehicle transmission. The engagement of a speed takes place in that one of the two gears 3 and 4 is connected with the shaft 5 on which they are loosely or freely rotatably mounted.

A hub portion 6 is arranged between the gears 3 and 4 which is adapted to be axially displaced. A shifting lever (not illustrated) or any other suitable shifting device engages in the groove 7 of the hub portion 6. The hub portion 6 is connected with the shaft 5 for purposes of transmission of the torque by means of radial, alternately interengageable pins generally designated by reference numerals 8 and 8' as shown in Figure 4. The pins 8' which are arranged at the shaft 5 and the pins 8 which are arranged at the hub portion 6, possibly in a detachable manner, may be constructed symmetrically with respect to a common center plane perpendicular to the axis and/or parallel to the axis with their own center planes, as shown in Figure 3, so that the hub portion 6 is shiftable in both directions and is effective in both directions of rotation. Each of the pins 8 and 8' is provided with surfaces 9 and 9', respectively extending parallel to the axis along which they abut against each in the neutral position thereof. Following the surfaces 9 and 9' are inclined surfaces 10 and 10', respectively, having a relatively smaller inclination, and adjacent the surfaces 10 and 10' are surfaces 11 and 11', respectively, having a relatively strongly inclined inclination, the significance and operative effect of which will be more fully explained hereinafter.

The hub portion 6 is constructed toward both sides thereof in a sleeve-like manner and is provided with two internal engaging surfaces 12 and 12' thereof which are constructed as friction surfaces of conically truncated shape. An engaging surface 13 and 13' each are coordinated for engagement with the respective surfaces 12 and 12' at the gears 3 and 4 which surfaces 13 and 13' are appropriately provided at the synchronizing ring 14 and 14', and more particularly along the outer circumference thereof. The synchronizing rings 14 and 14' are constructed as rings which are rigid and closed upon themselves i.e., which are endless and essentially non-springy in the radial direction thereof, and are mounted on a lateral cylindrical projection 15 and 15' of the gears 3 and 4, respectively. A coil spring 16 or any other suitable spring forces the synchronizing ring 14 and 14' continuously in the direction toward the hub portion 6. A securing means 17, for example, a snap ring or the like serves as abutment and prevents a movement of the ring 14 or 14' off the extension 15 or 15', i.e., a contact or engagement with the hub portion 6 already in the neutral position of the latter.

The side or face 18 and 18' of the synchronizing ring 14 and 14' are constituted as or provided with abutment or camming surfaces. The sides 18 and 18' are effective in the axial direction and are constructed as inclined surfaces to which are coordinated complementary counter-surfaces at the side or face 19 and 19' of gears 3 and 4, respectively. The camming and countersurfaces may be constructed in the same manner. However, the countersurfaces may also have the shape of cams, pins or the like. Figure 5 illustrates a modified embodiment in which pins S are used to cooperate with the surfaces 18 and 18' of which only the former are shown. The pins S are of essentially circular cross-section and are suitably secured in a detachable manner, for example, by a threaded engagement in the hub portion of gear 3. However, any other means of securing the pins S may also be used, for example, by riveting or press-fitting the same into the hub portion of the gear.

As may be readily seen from Figure 2, the side or face 18 of the synchronizing ring 14 is constructed for purposes of providing a camming surface as a curved track closed upon itself and preferably of sinusoidal shape. The camming surface 18' may be of similar construction. The faces 19 and 19' at the gears 3 and 4 may be of complementary similar shape. The height or peak of the sinusoidally curved cam track is appropriately so selected that in the illustrated position of the synchronizing rings 14 and 14' when abutting in their innermost positions against securing rings 17 under the influence of spring 16, the synchronizing rings 14 and 14' cannot rotate freely with respect to gears 3 and 4 respectively but instead the sinusoidally shaped raised portions of the curved tracks at the faces 18 and 18' abut against complementary raised portions at the faces 19 and 19' prior to reaching the highest points or peaks thereof. Hence, the synchronizing rings 14 and 14' are constrained at all times to rotate at the same speed as gears 3 and 4 respectively since only a limited relative movement or phase displacement is permitted between synchronizing ring 14 and gear 3 and between synchronizing ring 14' and gear 4 depending on the number and height of sinusoidally shaped curved tracks at the faces 18, 18', 19 and 19'.

A transverse groove 20 is provided in the engaging surfaces 13 and 13' of the synchronizing rings 14 and 14' into which wipe-off wedge members 21 are supported axially immovably by means of pins 22. The wedge members 21 may be disposed parallel or inclined to the outer surface of the conically truncated engaging surfaces and may project beyond the engaging surfaces at the edges thereof, particularly at the outer edges thereof as viewed from the hub portion.

One or several radial bores 23 are provided in the shaft part 5 between the pins 8 in which detent members, for example, ball members 25 which are spring-loaded by springs 24 are accommodated. Upon axial displacement, the ball members 25 engage the hub portion 6 and prevent in the absence of any torque, for example, with a temporary brief removal of the foot from the gas pedal, an unintentional sliding of the hub portion 6 back into the neutral position thereof.

*Operation*

The operation of the transmission in accordance with the present invention is as follows:

The gear 4 constitutes the first speed and the gear 3 the second speed while the shaft 5 constitutes the output shaft of the transmission. In the illustrated position, the hub portion is in the neutral position thereof without connection with either gear 3 or 4, and more particularly intermediate the latter so that none of the aforementioned speeds is engaged. The motor vehicle is now to be accelerated in first speed so that the output shaft 5 rotates. The gear 3 of the second speed thereby rotates faster than the shaft 5. For purposes of engaging the second speed, the hub portion 6 is now moved toward the left by the shifting lever (not shown) until the engaging surface 12 comes into abutment against the engaging surface 13 of the synchronizing ring 14. Simultaneously therewith, by reason of the axial displacement of the hub portion 6 the radial pins 8 of the hub portion 6 with the surfaces 9 thereof have slid off the surfaces 9' extending parallel to the axis of the pins 8' secured to the shaft 5 and now abut with the surfaces 10 thereof of relatively smaller inclination against the corresponding surfaces 10' of the pins 8' secured at the shaft 5. As a result of the difference in rotational speed between the gear 3 and the shaft 5, a friction moment is produced at the engaging surfaces 12 and 13 which seeks to rotate the hub part 6 with respect to the shaft part 5 and thereby also seeks to produce relative rotation of the synchronizing ring 14 with respect to the gear 3 since the relative rotational movement between shaft 5 and hub portion 6 is limited by the presence of pins 8 and 8'. The inclined transmission surfaces 10 between the shaft 5 and the hub portion 6 produce an axially directed force component which, together with the pressure maintained at the shifting lever seeks to further displace the hub portion 6 toward the left into the engaging direction thereof and therewith to force the engaging surfaces 12 and 13 against each other. However, since the synchronizing ring 14 with the cam surfaces 18 thereof is rigidly pressed against the sinusoidally shaped countersurfaces 19 as a result of the friction at the engaging surfaces 12 and 13, and more particularly, almost at the highest points or peaks thereof, a further axial movement toward the left of the synchronizing ring 14 and therewith also of the hub portion 6 is prevented. This position corresponds to the blocking position.

By reason of the friction which exists at the engaging surfaces 12 and 13, the differences in the rotational speeds of the shaft 5 and of the gear 3 are gradually eliminated until synchronism exists. As soon as synchronism exists, no friction moment is produced any longer at the engaging surfaces 12 and 13. Consequently, by the continued application of the axially directed force at the hub portion 6, the synchronizing ring 14 with the sinusoidally shaped cam surfaces 18 may slide off the complementary countersurfaces 19 to such an extent until the cam surfaces 18 and 19 mutually engage in the lowest position thereof, i.e., until the peaks of one engage the troughs of the other. The spring 16 is thereby compressed. By reason of this axial movement, the radial pins 8 of the hub portion 6 have now moved for mutual abutment with the surfaces 11 thereof having a relatively strong inclination against the complementary surfaces 11' provided at the pins 8' secured to the shaft 5. The axial force component produced by the torque which is thereby increased due to the relatively larger inclination of the surfaces 11 is increased by such an amount that the abutment of the engaging surfaces 12 and 13 now suffices for the force-locking engagement between the gear 3 and the shaft 5. The second speed is therewith engaged. Shifting back into neutral position and engagement of the first speed takes place in an analogous manner.

The wipe-off wedge members 21 are thrown by centrifugal force against the engaging surface 12 and 12' of the hub portion 6 and wipe-off the oil film thereat in the manner of pealing it off, so to speak. The wiped-off oil film is thrown outwardly over the projecting wedge members 21. In this manner, it is assured that the frictional engagement is not disturbed by the fact that an oil film first has to be compressed between the engaging surfaces 12 and 13 before full engagement can be obtained.

The term "fully closed upon itself" is used in the specification and claims herein in connection with the synchronizing rings 14 and 14' to describe an endless construction thereof which is essentially non-springy or non-resilient in the radial direction thereof as contrasted to the slotted, springy construction of the synchronizing rings known in the prior art, as mentioned hereinabove in column 1, lines 28 to 30 of the specification.

While I have shown and described one preferred embodiment in accordance with the present invention, it is understood that the same is not limited thereto but is susceptible of many changes and modifications within the scope of the present invention, and I intend to limit all such changes and modifications as encompassed by the appended claims.

I claim:

1. In an arrangement for shifting a change-speed transmission adapted to be shifted in a step-like manner and provided with pairs of gears in continuous meshing engagement with each other, shaft means, one of each of said pairs of gears being rotatably mounted on said shaft means, a force-locking shifting clutch arrangement comprising an axially displaceable hub portion operatively connected with said shaft means for selectively engaging the latter with at least one of said rotatably mounted gears, synchronizing ring means between said hub portion and said one rotatable gear, said synchronizing ring means being closed upon itself, and being supported at one of the two parts consisting of said hub portion and said one rotatable gear, said synchronizing ring means and the other part being provided with inclined engaging surfaces to enable complete force-locking engagement therebetween, and means between said synchronizing ring means and said one part to effect blocking of said synchronizing ring means during the occurrence of a friction moment at said engaging surfaces to thereby enable only a limited frictional engagement and prevent complete force-locking engagement thereat between said hub portion and said one rotatable gear until synchronism exists therebetween.

2. An arrangement as defined in claim 1 wherein said engaging surfaces are friction surfaces of conically-truncated shape.

3. An arrangement as defined in claim 1 wherein said one part is provided with an extension for supporting thereon said synchronism ring means, and spring means between said one part and said synchronism ring means for urging the latter continuously in the direction of said hub portion.

4. An arrangement as defined in claim 3 further comprising means arranged in said extension for retaining said synchronizing ring means on said extension.

5. An arrangement as defined in claim 1 wherein said means between said synchronizing ring means and said one part include abutment surfaces.

6. An arrangement as defined in claim 5 wherein said abutment surfaces are formed as inclined surfaces disposed at the mutually facing sides of said synchronizing ring means and said one part.

7. An arrangement as defined in claim 6 wherein said abutment surfaces are sinusoidally shaped cam tracks.

8. An arrangement as defined in claim 1 wherein said means between said synchronizing ring means and said one part include detachable pins forming abutment surfaces.

9. An arrangement as defined in claim 1 further comprising means cooperating with said engaging surfaces for removing the oil film therebetween.

10. An arrangement as defined in claim 9 wherein said last-mentioned means include wipe-off wedge means having radial play and arranged essentially immovably in said synchronizing ring means.

11. An arrangement as defined in claim 10 wherein said wipe-off wedge means have radial play.

12. An arrangement as defined in claim 11 wherein said wedge means have an inclination to the outer surface of said synchronizing ring means.

13. An arrangement according to claim 10 wherein said wedge means project beyond the edge of said engaging surfaces.

14. An arrangement as defined in claim 12 wherein said wedge means projections extend beyond the outer edge of said engaging surfaces.

15. An arrangement as defined in claim 1 further comprising transmission means between said hub portion and said shaft means for transmitting torque therebetween in such a manner as to provide a transmission of forces only in the circumferential direction with said hub portion in neutral position thereof and to produce an axial force component from the torque with said hub portion in the blocking and engaging positions thereof.

16. An arrangement as defined in claim 15 wherein said transmission means includes alternately engaging radial pins secured to said hub portion and said shaft means.

17. An arrangement as defined in claim 16 wherein said radial pins are provided with transmission surfaces parallel to the axis of said shaft means corresponding to the neutral position, and wherein said pins further include inclined transmission surfaces with the inclination being smaller in the blocking position than in the engaging position thereof.

18. An arrangement as defined in claim 16 wherein said pins are symmetrically constructed with respect to a plane extending normal to the axis of said shaft means and with respect to the center plane parallel to the axis.

19. An arrangement as defined in claim 1 further comprising detent means including a spring-loaded detent member arranged in one of said two parts consisting of said shaft means and said hub portion and engaging in apertures provided in the other of said two last-mentioned parts.

20. An arrangement for shifting a change-speed transmission adapted to be shifted in a step-like manner and provided with at least one pair of gears in continuous meshing engagement with each other, shaft means, one of each of said pairs of gears being rotatably mounted on said shaft means, a force-locking clutching arrangement including an axially displaceable hub portion operatively connected with said shaft means for engaging selectively the latter with said rotatably mounted gear, synchronizing ring means between said hub portion and said one rotatable gear, said synchronizing ring means being closed upon itself and being supported at one of the two parts consisting of said hub portion and said one rotatable gear, said synchronizing ring means and the other part being provided with engaging surfaces to enable complete force-locking engagement therebetween, and means between said synchronizing ring means and said one part to enable during the occurrence of a friction moment at said engaging surfaces only a limited frictional engagement and thereby prevent complete force-locking engagement thereat between said hub portion and said one rotatable gear until synchronism exists therebetween.

21. An arrangement as defined in claim 20, wherein said engaging surfaces serve simultaneously for the complete engagement between said hub portion and said one gear.

References Cited in the file of this patent

UNITED STATES PATENTS

| | | |
|---|---|---|
| 1,803,535 | Murray | May 5, 1931 |
| 2,410,511 | Letsinger et al. | Nov. 5, 1946 |

FOREIGN PATENTS

| | | |
|---|---|---|
| 20,357 | Germany | Dec. 29, 1955 |